(12) United States Patent
Cho

(10) Patent No.: US 8,382,306 B2
(45) Date of Patent: Feb. 26, 2013

(54) LIGHTING DEVICE FOR DISPLAY DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 439 days.

(21) Appl. No.: 12/672,125

(22) PCT Filed: Mar. 24, 2008

(86) PCT No.: PCT/JP2008/055437
§ 371 (c)(1),
(2), (4) Date: Feb. 4, 2010

(87) PCT Pub. No.: WO2009/025099
PCT Pub. Date: Feb. 26, 2009

(65) Prior Publication Data
US 2011/0205447 A1 Aug. 25, 2011

(30) Foreign Application Priority Data
Aug. 22, 2007 (JP) .................................. 2007-216286

(51) Int. Cl.
*G09F 13/04* (2006.01)
(52) U.S. Cl. ........ 362/97.2; 362/632; 362/633; 362/634
(58) Field of Classification Search ................. 362/97.2, 362/600–634
See application file for complete search history.

(56) References Cited

U.S. PATENT DOCUMENTS

| | | | | |
|---|---|---|---|---|
| 6,431,726 B1 * | 8/2002 | Barton | ........................... | 362/220 |
| 2006/0279946 A1 * | 12/2006 | Park et al. | ........................ | 362/97 |

| | | | |
|---|---|---|---|
| 2007/0091589 A1 | 4/2007 | Choi et al. | |
| 2009/0046445 A1 | 2/2009 | Namiki et al. | |
| 2009/0279320 A1 | 11/2009 | Yokota et al. | |

FOREIGN PATENT DOCUMENTS

| | | |
|---|---|---|
| CN | 1991514 A | 7/2007 |
| JP | 2006-286341 A | 10/2006 |
| JP | 2007-180006 A | 7/2007 |
| JP | 2008-66283 A | 3/2008 |
| WO | WO 2006046828 A1 * | 5/2006 |
| WO | 2008/001710 A1 | 1/2008 |

OTHER PUBLICATIONS

Official Communication issued in International Patent Application No. PCT/JP2008/055437, mailed on Jun. 3, 2008.

* cited by examiner

*Primary Examiner* — Sean Gramling
(74) *Attorney, Agent, or Firm* — Keating & Bennett, LLP

(57) ABSTRACT

A lighting device for a display device includes a plurality of linear light sources and a light source holding member arranged to hold the linear light sources. The light source holding member includes a first member and a second member. A sliding mechanism is provided between the first member and the second member, so as to allow parallel displacement of the first member and the second member relative to each other. The first member includes a first light source holder arranged to directly hold a first linear light source of the plurality of linear light sources. The second member includes a second light source holder arranged to directly hold a second linear light source other than the first linear light source.

11 Claims, 17 Drawing Sheets

LIGHTING DEVICE FOR DISPLAY DEVICE, DISPLAY DEVICE AND TELEVISION RECEIVER

1. FIELD OF THE INVENTION

The present invention relates to a lighting device for a display device, a display device and a television receiver.

2. DESCRIPTION OF THE RELATED ART

A liquid crystal panel used in a liquid crystal display device such as a liquid crystal TV set, cannot emit light for itself, and therefore a backlight device should be additionally provided as an external lamp. The backlight device is arranged on the backside of the liquid crystal panel (i.e., on the opposite side of the display surface). The backlight device includes a metallic or resin chassis having an opening on the liquid crystal panel side, and further includes a number of fluorescent tubes (e.g., cold cathode tubes) as lamps contained in the chassis. Further included are a number of optical members (such as a diffusing sheet), which are arranged in the opening of the chassis so that the lights from the cold cathode tubes can be effectively applied to the liquid crystal panel. The backlight device further includes lamp clips arranged to hold the cold cathode tubes of elongated tubular shapes on the chassis. An example of the lamp clips is disclosed in JP-A-2006-286341.

The lamp clips disclosed in JP-A-2006-286341 are arranged so that each lamp clip can position and support a plurality of fluorescent tubes on the backside of the liquid crystal panel. The lamp clip includes holding portions, each of which can hold a fluorescent tube while partially surrounding the outer circumference thereof. The lamp clip further includes projecting portions, each of which can support the fluorescent tube while having partial contact with the outer circumference thereof, so that a distance is maintained between the portion of the outer circumference of the fluorescent tube and the inner portion of the holding portion facing the fluorescent tube. Particularly, in order to improve efficiency in assembly operation, one lamp clip typically includes a plurality of holding portions as in JP-A-2006-286341, so that each lamp clip can hold a plurality of fluorescent tubes.

Note that the arrangement of cold cathode tubes depends on the constructions of lamp clips mounted to the chassis. That is, the lamp holding portions are arranged at predetermined positions on the lamp clip, and therefore the arrangement pattern of cold cathode tubes is uniquely determined by the construction of the lamp clip. Accordingly, the same lamp clip cannot be used for different arrangement patterns of cold cathode tubes, for example.

Thus, lamp clips should be designed and manufactured individually for different arrangement patterns of cold cathode tubes. For example, lamp clips should be manufactured individually for different sizes of liquid crystal TV sets, because the arrangement pattern of cold cathode tubes varies depending on the size. Even among liquid crystal TV sets of the same size, the number or arrangements of cold cathode tubes may be varied in consideration of cost or performance. The above problem is still relevant to this case, and may cause extreme inefficiency and cost increase.

In some cases, cold cathode tubes of a backlight device may be arranged at irregular intervals (so as to form an unequal lamp-pitch structure), or more specifically, the cold cathode tubes may be densely arranged at the center side of the backlight device while being sparsely arranged at the end sides of the backlight device, for example. In this case, lamp clips used within the single backlight device should have a variety of constructions, which may cause cost increase. Further, in this case, the different types of lamp clips should be distinguished during an assembly operation, which requires time and effort.

SUMMARY OF THE INVENTION

In view of the foregoing circumstances, preferred embodiments of the present invention provide a lighting device for a display device having a construction capable of adopting or adjusting to take on different arrangement intervals for light sources and thereby contributing to cost reduction. Preferred embodiments of the present invention also provide a display device including the lighting device, and a television receiver including the display device.

A lighting device for a display device, according to a preferred embodiment of the present invention, includes a plurality of linear light sources and a light source holding member arranged to hold the linear light sources. The light source holding member includes a first member and a second member. A sliding mechanism is provided between the first member and the second member, so as to allow parallel displacement of the first member and the second member relative to each other. The first member includes a first light source holder arranged to directly hold a first linear light source of the plurality of linear light sources. The second member includes a second light source holder arranged to directly hold a second linear light source other than the first linear light source.

In the present lighting device for a display device, parallel displacement (which in this specification and the present invention can also include substantially parallel displacement) of the first member and the second member by the sliding mechanism can achieve parallel displacement of the first light source holder of the first member and the second light source holder of the second member. Thereby, an interval between light source holders can be varied within the single light source holding member. Accordingly, the arrangement of linear light sources to be held by the respective light source holders of the single light source holding member can be variously designed to vary in distance therebetween. That is, the same light source holding member can be used for linear light sources to be arranged at intervals of varying length, for example.

Consequently, the light source holding member is not required to be designed and manufactured individually for different intervals between light source holders adapted to varying intervals between linear light sources. If the arrangement pattern (or arrangement interval) for linear light sources varies depending on the size of a display device, for example, the same light source holding member can be used for different arrangement patterns. That is, the light source holding member can adapt to different sizes of display devices by arbitrary adjustment of the interval between the first light source holder and the second light source holder, which can be achieved by parallel displacement of the first member and the second member, using its own sliding mechanism. Even among display devices of the same size, the number of linear light sources or arrangement pattern (or arrangement interval) for linear light sources may be varied in consideration of cost or performance. Also in this case, adaptation to different intervals can be achieved by arbitrary adjustment of the interval between the light source holders, using the sliding mechanism.

Thus, the same light source holding member can be used for various arrangement patterns of linear light sources, according to a preferred embodiment of the present invention. Consequently, the present lighting device for a display device can be applied to various display devices, which contributes to cost reduction in a display device or a television receiver.

In some cases, linear light sources of a lighting device for a display device may be arranged at irregular intervals (so as to define an unequal lamp-pitch structure), or more specifically, the intervals between linear light sources may be set to be narrow at the center portion of the lighting device for a display device and to be wide at the end portions of the lighting device for a display device, for example. Also in this case, the same light source holding member can be used for different intervals between linear light sources, because of arbitrary adjustment of the distance between the light source holders. Thereby, cost can be reduced, compared to using different light source holding members for different locations or different intervals between linear light sources. Further, the type of the light source holding member is not required to be distinguished during an assembly operation, and therefore the step of distinguishing each light source holding member can be eliminated.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Preferred embodiment 1 of the present invention will be explained with reference to FIGS. 1 to 9. A liquid crystal display device 10 as a display device will be illustrated in the present preferred embodiment.

Figure 1:
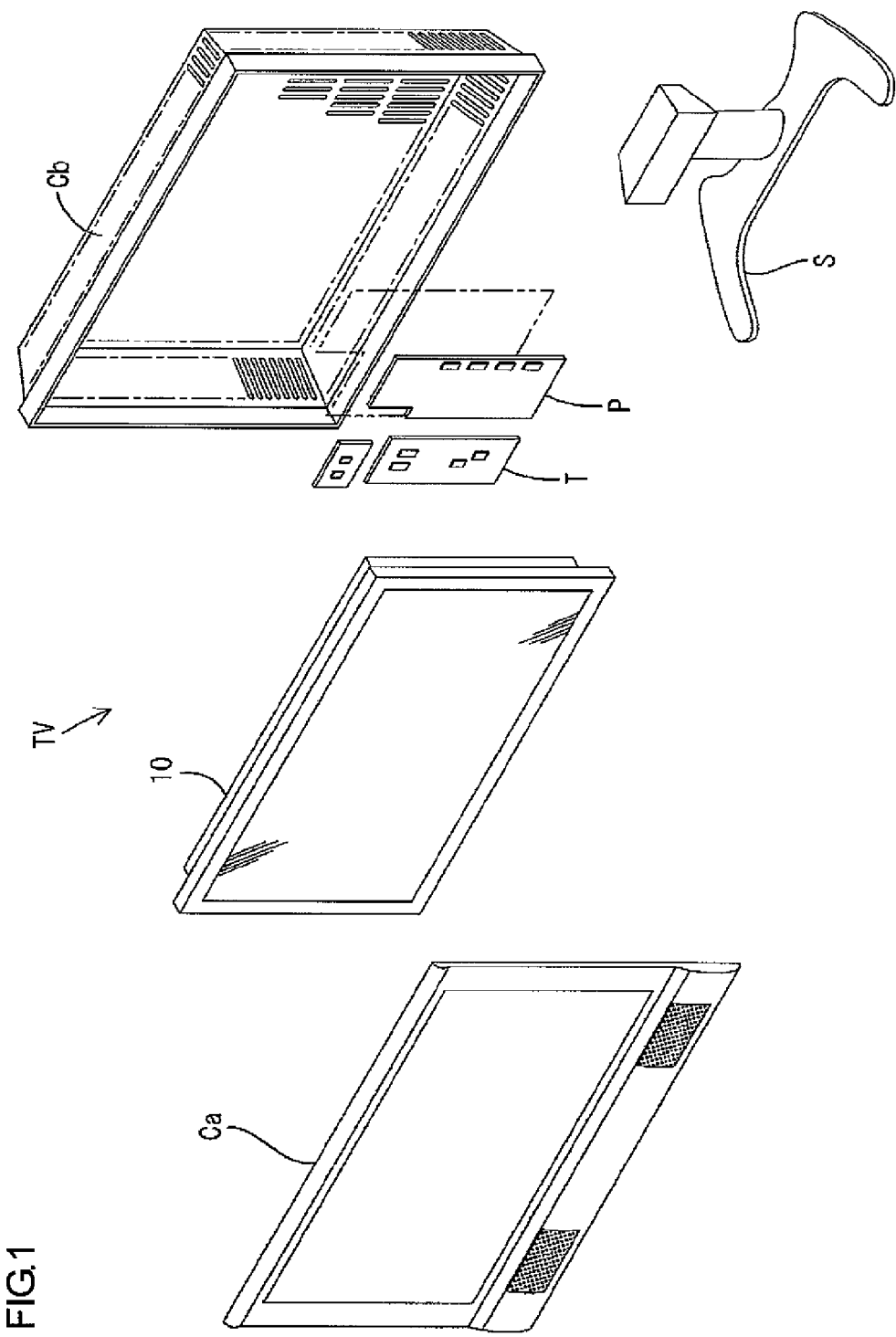
FIG. 1 is an exploded perspective view showing the general construction of a television receiver according to preferred embodiment 1 of the present invention.
Figure 2:
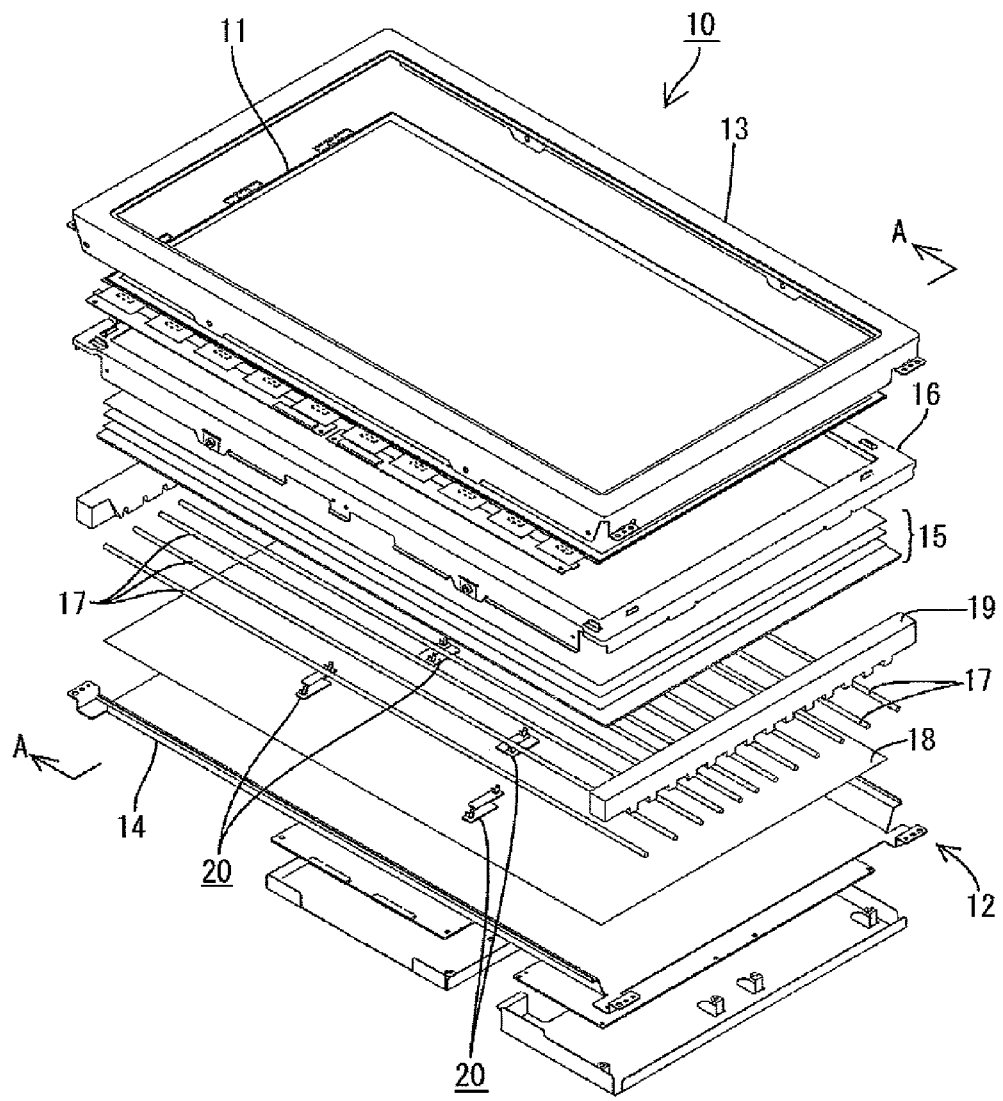
FIG. 2 is an exploded perspective view showing the general construction of a liquid crystal display device included in the television receiver shown in FIG. 1.
Figure 3:
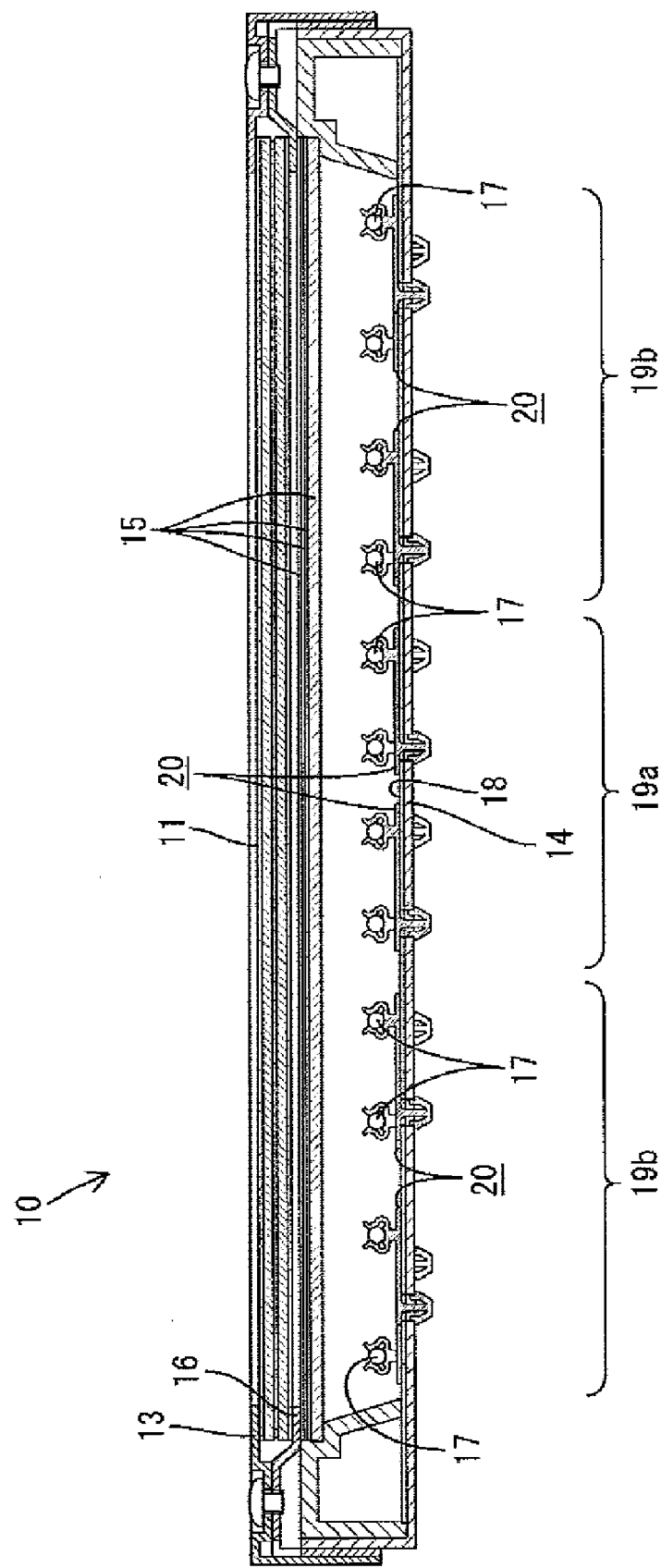
FIG. 3 is a sectional view of the liquid crystal display device of FIG. 2 along the line A-A.
Figure 4:
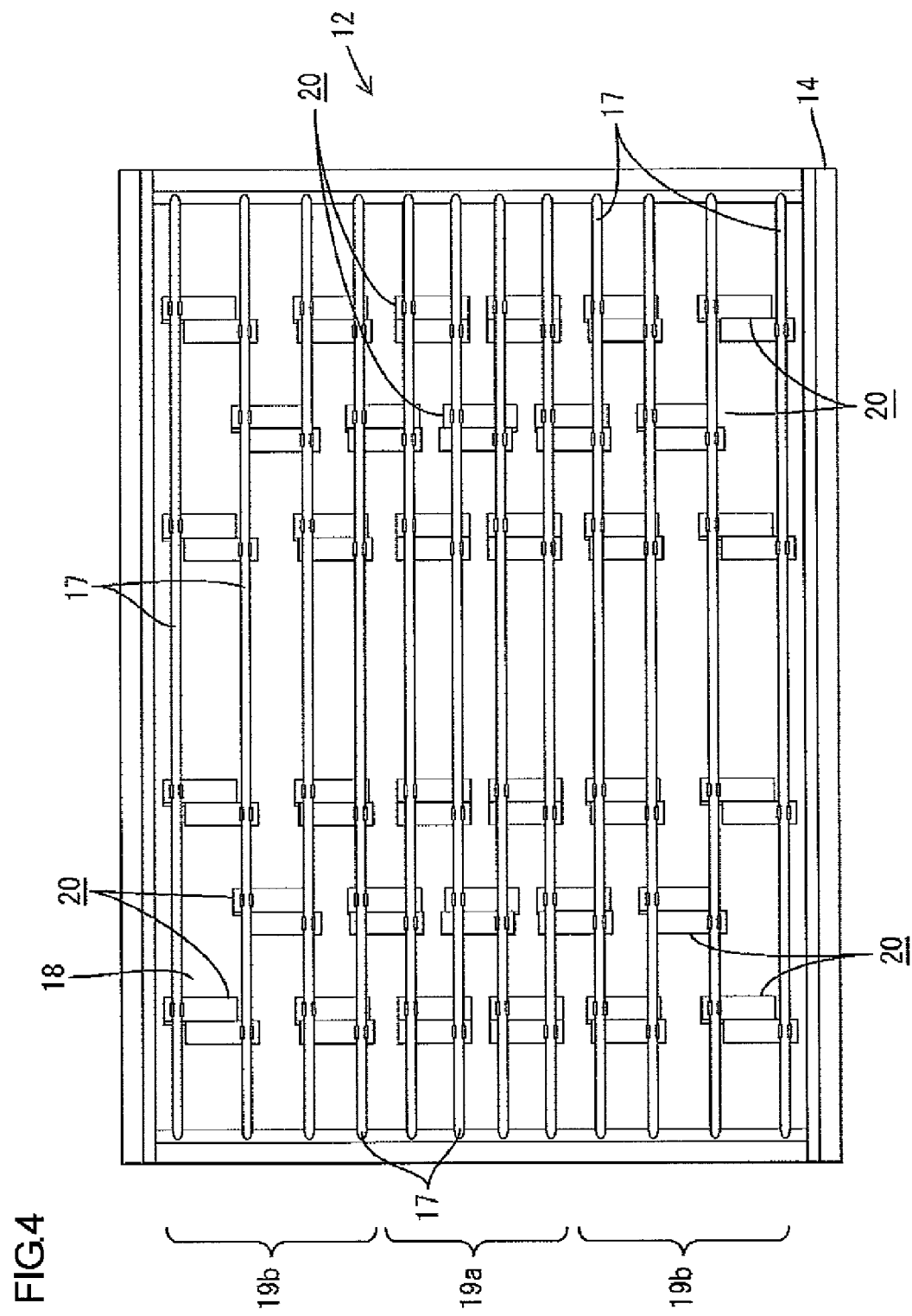
FIG. 4 is a plan view of a backlight device included in the liquid crystal display device shown in FIG. 2.
Figure 5:
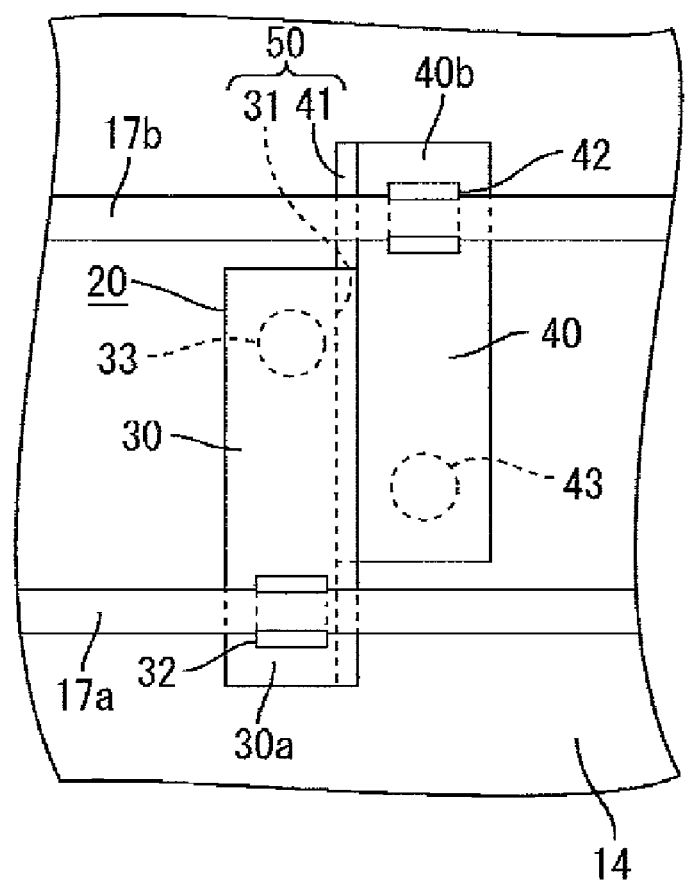
FIG. 5 is a plan view showing the construction of a lamp clip included in the backlight device shown in FIG. 4.
Figure 6:
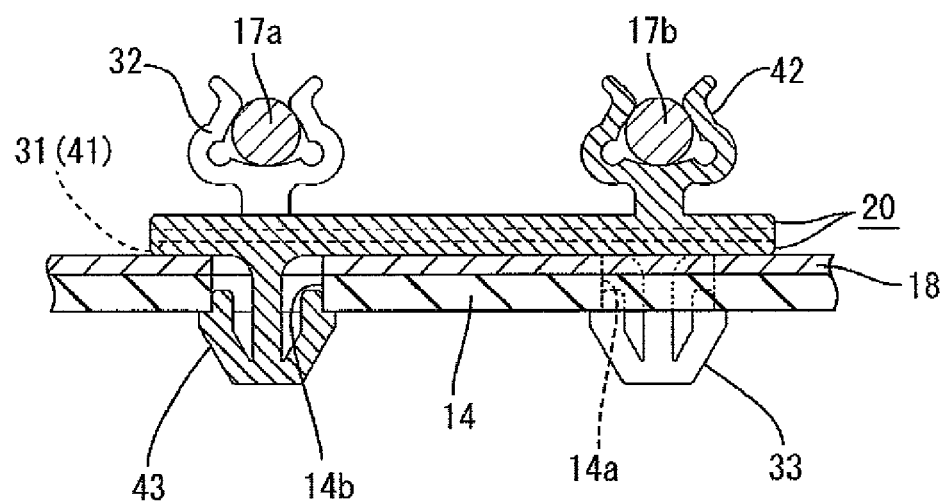
FIG. 6 is a first side view showing the construction of the lamp clip shown in FIG. 5.
Figure 7:
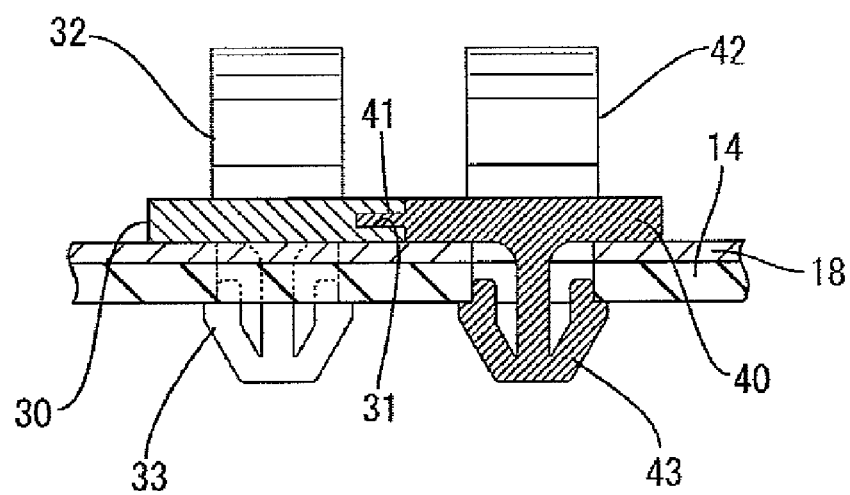
FIG. 7 is a second side view showing the construction of the lamp clip shown in FIG. 5.
Figure 8:
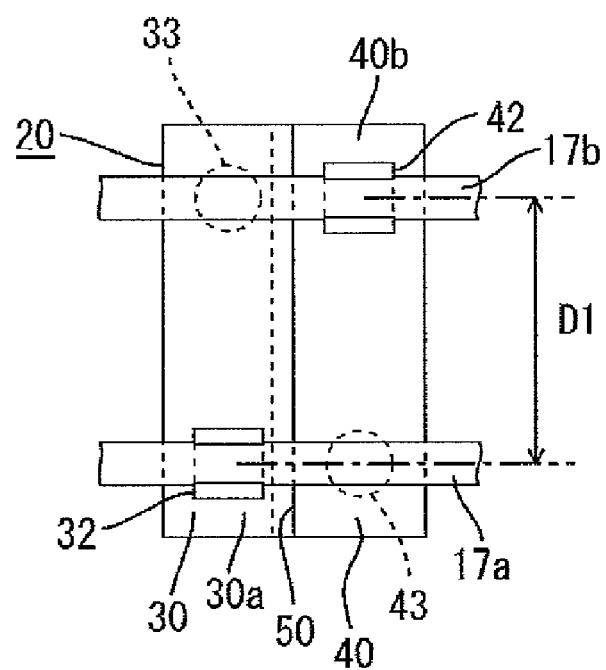
FIG. 8 is an explanatory diagram showing the operation of a sliding mechanism included in the lamp clip.
Figure 9:
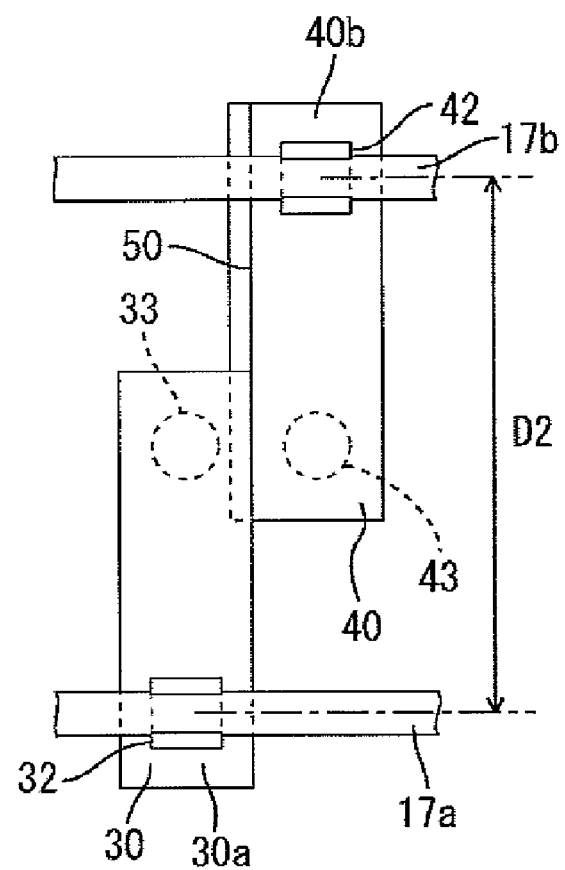
FIG. 9 is an explanatory diagram showing the operation of the sliding mechanism included in the lamp clip.

FIG. 1 is an exploded perspective view showing the general construction of a television receiver according to the present preferred embodiment. FIG. 2 is an exploded perspective view showing the general construction of the liquid crystal display device included in the television receiver shown in FIG. 1. FIG. 3 is a sectional view showing the general construction of the liquid crystal display device along the line A-A. FIG. 4 is a plan view of a backlight device included in the liquid crystal display device. FIG. 5 is a plan view showing the construction of a lamp clip included in the backlight device. FIG. 6 is a first side view showing the construction of the lamp clip. FIG. 7 is a second side view showing the construction of the lamp clip. FIGS. 8 and 9 are explanatory diagrams showing the operation of a sliding mechanism included in the lamp clip.

Referring to FIG. 1, the television receiver TV according to the present preferred embodiment includes the liquid crystal display device (display device) 10, and front and back cabinets Ca and Cb capable of holding the liquid crystal display device 10 therebetween. Further included are a power source P, a tuner T and a stand S. Referring to FIG. 2, the liquid crystal display device 10 preferably has a horizontally-elongated rectangular shape as a whole, and includes a liquid crystal panel 11 as a display panel and a backlight device (lighting device for a display device) 12 as an external light source, which are integrally held by a bezel 13 and the like.

Next, the liquid crystal panel 11 and the backlight device 12 of the liquid crystal display device 10 will be explained (See FIGS. 2 and 3).

The liquid crystal panel 11 includes a pair of glass substrates, which are attached to each other so as to face each other while a gap of a predetermined size is kept therebetween. Liquid crystal is sealed between the glass substrates. On one of the glass substrates, components such as switching elements (e.g., TFTs) connected to source wiring lines and gate wiring lines extending at right angles to each other, and pixel electrodes connected to the switching elements are provided. On the other of the glass substrates, components such as a counter electrode and a color filter having R, G, and B color sections arranged in a predetermined pattern are provided.

The backlight device 12 is a so-called direct-light type backlight device that includes a plurality of linear light sources (e.g., cold cathode tubes 17 as high-pressure discharge tubes, in the present preferred embodiment), which are positioned directly below the back surface of the liquid crystal panel 11 (i.e., the panel surface on the opposite side of the display side), and are arranged along the panel surface.

The backlight device 12 includes a chassis 14 having a substantially box-shaped configuration with an opening on its upper side, and a plurality of optical members 15 (e.g., a diffuser plate, a diffusing sheet, a lens sheet and a reflective polarizing plate, in order from the lower side of the figure) which are arranged to cover in the opening of the chassis 14. Further included is a frame 16 arranged to hold the optical members 15 on the chassis 14. The chassis 14 includes the cold cathode tubes 17 and lamp clips (or light source supporting members) 20 described below. Note that the optical member 15 side of the cold cathode tubes 17 corresponds to the light emitting side of the backlight device 12.

A light reflecting sheet 18 is provided on the inner surface side (or light source side) of the chassis 14, so as to form a light reflecting surface. The chassis 14 thus includes the light reflecting sheet 18, and thereby the lights from the cold cathode tubes 17 can be reflected to the optical members 15 such as the diffuser plate.

Each of the cold cathode tubes 17 preferably is a linear light source that has an elongated tubular shape extending in one direction. A number (e.g., twelve in FIG. 1) of cold cathode tubes 17 are arranged parallel or substantially parallel to one another, and are contained in the chassis 14 so that the longitudinal direction (or axial direction) thereof corresponds to the long-side direction of the chassis 14. Referring to FIGS. 3 and 4, the cold cathode tubes 17 are arranged so that a narrow-interval area 19a where the arrangement intervals for the cold cathode tubes 17 are relatively narrow and wide-interval areas 19b where the arrangement intervals are relatively wide are provided. Specifically, the narrow-interval area 19a is positioned in the array direction of the cold cathode tubes 17 so as to be on the center side, and therefore is positioned at the central area of the backlight device 12. The wide-interval areas 19b are positioned in the array direction of the cold cathode tubes 17 so as to be on the end sides, and therefore are positioned at the end areas of the backlight device 12. The lamp clips 20 fix and support the cold cathode tubes 17 on the chassis 14.

Referring to FIG. 4, the plurality of lamp clips 20 are mounted to the chassis 14, so that each cold cathode tube 17 can be thereby supported at a plurality of points spaced along its longitudinal direction. The lamp clips 20 are preferably made of synthetic resin (e.g., polycarbonate). Referring to FIGS. 5 to 7, each lamp clip preferably includes a first clip (first member) 30 and a second clip (second member) 40, which preferably have rectangular plate-shaped configurations. The lamp clips 20 preferably are entirely white in color, for example, in order to prevent visible shadows thereof when the cold cathode tubes 17 are lighted.

Referring to FIG. 7, a rail portion 31 is provided on one long side of the four sides of the first clip 30, so as to form a groove-shaped depression on the side surface along the long side and extend along the long side. On the other hand, a protruding portion (or slide member) 41 is provided on one long side of the four sides of the second clip 40, so as to protrude from the side surface along the long side and extend along the long side. The rail portion 31 and the protruding portion 41 are arranged to engage with each other, and thereby the first clip 30 and the second clip 40 are united to form the single lamp clip 20.

The protruding portion 41 is arranged to slide on the rail portion 31, to thereby define a sliding mechanism 50. The sliding mechanism 50 allows parallel displacement of the first clip 30 and the second clip 40 along the long-side direction.

On the upper surface of the first clip 30 (i.e., the surface facing the cold cathode tubes 17), a lamp holder (first light source holder) 32 capable of holding a cold cathode tube 17a (first linear light source) is provided on one long-side-directional end portion 30a (i.e., the end portion capable of being moved away from the second clip 40 by the sliding mechanism 50), as shown in FIG. 5. On the second slip 40, a lamp holder 42 (second light source holder) capable of holding a cold cathode tube 17b (second linear light source) other than the cold cathode tube 17a is provided on the end portion 40b unable to face the lamp holder 32 of the first clip 30 (i.e., the end portion capable of being moved away from the first clip 30 by the sliding mechanism 50). That is, the plurality of lamp holders 32, 42 are not arranged along the longitudinal direction of a single cold cathode tube 17, but are arranged along the array direction of the cold cathode tubes 17 so as to be capable of holding parallel-arranged cold cathode tubes 17a, 17b.

Each of the lamp holders 32, 42 generally has an open annular shape with an upper opening, which can entirely or partially surround the circumference of a cold cathode tube 17 and allows attachment and detachment of the cold cathode tube 17 through the upper opening (See FIG. 6).

Referring to FIG. 6, an engaging portion 33 (first engaging portion) and an engaging portion 43 (second engaging portion) are provided on the respective lower surfaces of the first clip 30 and the second clip 40 (i.e., on the surfaces on the opposite side of the lamp holders 32, 42), so as to project to the chassis 14 side. In the present preferred embodiment, each engaging portion 33, 43 is positioned in the long-side direction of the first clip 30 or the second clip 40, so as to be on the end portion that is on the opposite side of the end portion 30a, 40b having the lamp holder 32, 42, as shown in FIG. 5. The engaging portions 33, 43 can be inserted into mounting holes 14a, 14b formed through the chassis 14, and can engage therewith as a result of the insertion.

A procedure for mounting a lamp clip 20 to the chassis 14 is as follows, for example. First, the engaging portion 33 of the first clip 30 is inserted into a mounting hole 14a, and thereby the engaging position of the first clip 30 is fixed. Next, the second clip 40 is slid on (or moved parallel to) the first clip 30, so that the engaging portion 43 of the second clip 40 is located right above a mounting hole 14b. The engaging portion 43 is inserted into the mounting hole 14b, and thereby the engaging position of the second clip 40 is fixed. Then, the mounting of the lamp clip 20 to the chassis 14 is completed. According to this unique construction, the relative positions of the first clip 30 and the second clip 40, and therefore the distance between the lamp holders 32, 42 depend on the positions of the mounting holes 14a, 14b on the chassis 14 and the positions of the engaging portions 33, 43 on the lamp clip 20.

The television receiver TV, the liquid crystal display device 10 and the backlight device 12 having the above constructions according to the present preferred embodiment can provide the following operational effects.

The lamp clip 20 of the present preferred embodiment includes a first clip 30 and a second clip 40 capable of parallel displacement by the sliding mechanism 50. The first clip 30 and the second slip 40 include lamp holders 32, 42, respectively. According to this unique construction, parallel displacement of the first clip 30 and the second clip 40 by the sliding mechanism 50 can achieve parallel displacement of the lamp holders 32, 42. Thereby, an interval between the lamp holders 32, 42 can be varied within the single lamp clip.

How to use the lamp clip 20 will be hereinafter explained with reference to FIGS. 8 and 9.

Referring to FIG. 8, when the distance D1 between cold cathode tubes 17a, 17b is set to be small, for example, the lamp clip 20 can be used without undergoing sliding and therefore with the second clip 40 in alignment with the first clip 30. In this way, the lamp holders 32, 42 can be provided with a small distance therebetween, so as to hold the cold cathode tubes 17a, 17b.

In contrast, when the distance D2 between cold cathode tubes 17a, 17b is set to be large as shown in FIG. 9, the lamp clip 20 can be used after undergoing sliding and therefore with the second clip 40 displaced from the first clip 30. In this way, the lamp holders 32, 42 can be provided with an adequately increased distance therebetween.

Accordingly, the arrangement of cold cathode tubes 17a, 17b to be held by the single lamp clip 20 can be variously designed to vary in distance therebetween. That is, the same lamp clips 20 can be used for cold cathode tubes 17 to be arranged at different intervals, for example. Consequently, the present construction contributes to cost reduction.

In the present preferred embodiment, the sliding mechanism 50 preferably includes a rail portion 31 provided on the first clip 30 and a protruding portion 41 provided on the second clip 40.

According to this unique construction, the variation of the relative positions of the first clip 30 and the second clip 40 due to the sliding mechanism 50 can be achieved by sliding the protruding portion 41 on the rail portion 31. Thereby, the interval between the lamp holders 32, 42 provided thereon can be set to a desired distance, with increased flexibility.

In the present preferred embodiment, the lamp holder 32 is provided on the end portion 30a of the first clip 30, i.e., on the end portion capable of being moved away from the second clip 40 by the sliding mechanism 50. The lamp holder 42 is provided on the end portion 40b of the second clip 40, i.e., on the end portion capable of being moved away from the first clip 30 by the sliding mechanism 50.

If the lamp holders 32, 42 are thus located on the end portions 30a, 40b so as to be capable of being moved away from each other by the sliding mechanism 50, the distance between the lamp holders 32, 42 can be varied over the maximum range. Consequently, the lamp clip 20 can adapt to a variety of arrangement patterns (or different arrangement intervals) for cold cathode tubes 17.

In the present preferred embodiment, the lamp clip 20 preferably includes engaging portions 33, 43, which project from the first clip 30 and the second clip 40 to the chassis 14 side. The engaging portions can be inserted into mounting holes 14a, 14b provided on the chassis 14, and can engage therewith as a result of the insertion.

According to this unique construction, in the course of engagement of the lamp clip 20 with the chassis 14, the engaging position of the first clip 30 is fixed when the engaging portion 33 is inserted into a mounting hole 14a, and the engaging position of the second clip 40 is fixed when the engaging portion 43 is inserted into a mounting hole 14b. Therefore, the distance between the lamp holders 32, 42 depends on the positions of the mounting holes 14a, 14b on the chassis 14 and the positions of the engaging portions 33, 43 on the lamp clip 20. Accordingly, the interval between the lamp holders 32, 42 can be set to a desired distance by properly positioning the mounting holes 14a, 14b and the engaging portions 33, 43.

In the present preferred embodiment, the plurality of cold cathode tubes 17 are preferably arranged parallel or substantially parallel to one another, so that the narrow-interval area 19a where the arrangement intervals are relatively narrow is provided at the central area of the array while the wide-interval areas 19b where the arrangement intervals are relatively wide are provided at the end areas of the array.

When the cold cathode tubes 17 are thus arranged to provide the narrow-interval area 19a at the central area of the array, the present backlight device 12 can have enhanced illumination brightness at the central area of the array. Consequently, the visibility of display can be improved on the liquid crystal display device 10 or the television receiver TV having the present backlight device 12.

Even in this case where cold cathode tubes 17 are arranged at intervals of varying length, the same lamp clips 20 can be used to hold the cold cathode tubes 17 regardless of varying arrangement intervals, because the interval between the lamp holders 32, 42 of each lamp clip 20 is adjustable. Consequently, the cost of lamp clips 20 can be reduced. Further, the lamp clips 20 are not required to be distinguished, and therefore the lamp clip distinguishing step can be eliminated.

Preferred Embodiment 2

Next, preferred embodiment 2 of the present invention will be explained with reference to FIGS. 10 and 11. The positions of engaging portions on a lamp clip are modified in the present preferred embodiment 2. However, the other constructions are similar to the above preferred embodiment. Therefore, the same parts as the above preferred embodiment are designated by the same symbols, and redundant explanations are omitted.

Figure 10:
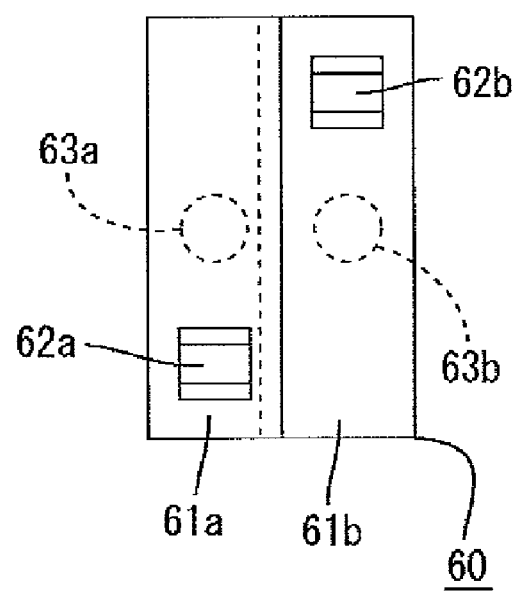
FIG. 10 is a plan view showing the construction of a lamp clip according to preferred embodiment 2 of the present invention.
Figure 11:
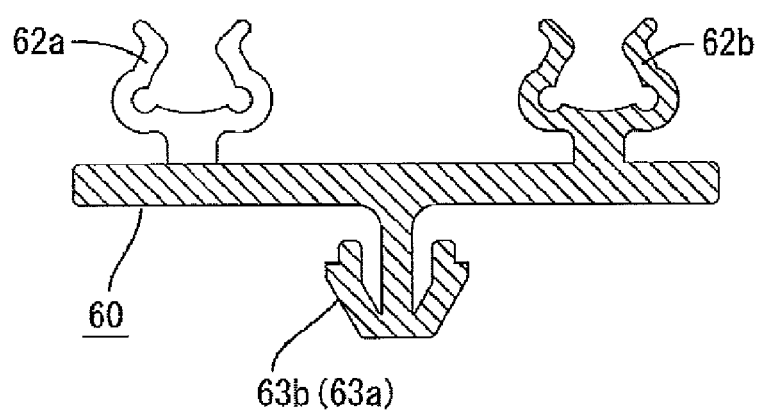
FIG. 11 is a first side view showing the construction of the lamp clip shown in FIG. 10.

Referring to FIGS. 10 and 11, the lamp clip 60 includes a first clip 61a and a second clip 61b. Lamp holders 62a, 62b are provided on the upper surfaces thereof, while engaging portions 63a, 63b are provided on the lower surfaces thereof so as to project to the chassis 14 side. In the present preferred embodiment, each engaging portion 63a, 63b is positioned in the long-side direction of the first clip 61a or the second clip 61b so as to be at the central area. According to this unique construction, the engaging portions 63a, 63b are linearly aligned when the second clip 61b is in alignment with the first clip 61a without undergoing sliding.

In the course of engagement of the lamp clip 60 with the chassis 14, the engagement of the lamp clip 60 can be completed by pressing the portions of the first clip 61a and the second clip 61b located right above the respective engaging portions 63a, 63b, for example. According to the above construction, the engaging portions 63a, 63b are linearly aligned when the second clip 61b is in alignment with the first clip 61a without undergoing sliding. In this case, the engagement of the lamp clip 60 can be completed by pressing a point on the line that connects the linearly-aligned engaging portions. Thus, the engagement of the lamp clip 60 can be achieved with reduced effort.

Preferred Embodiment 3

Next, preferred embodiment 3 of the present invention will be explained with reference to FIGS. 12 and 13. The positions of engaging portions on a lamp clip are also modified in the present preferred embodiment 3. However, the other constructions are similar to the above preferred embodiment 1. Therefore, the same parts as the above preferred embodiment 1 are designated by the same symbols, and redundant explanations are omitted.

Figure 12:
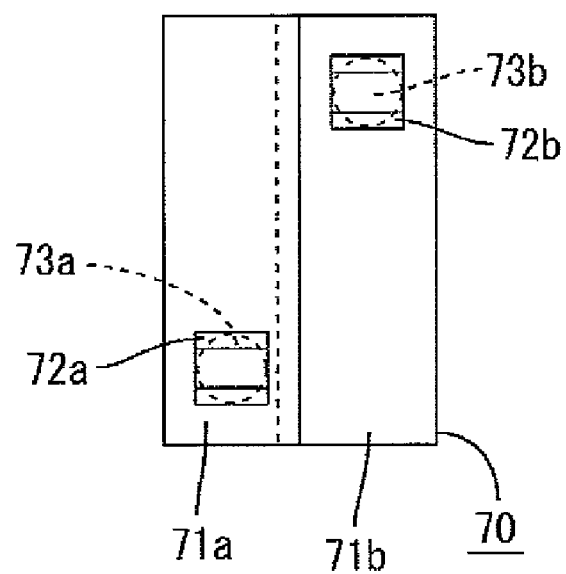
FIG. 12 is a plan view showing the construction of a lamp clip according to preferred embodiment 3 of the present invention.
Figure 13:
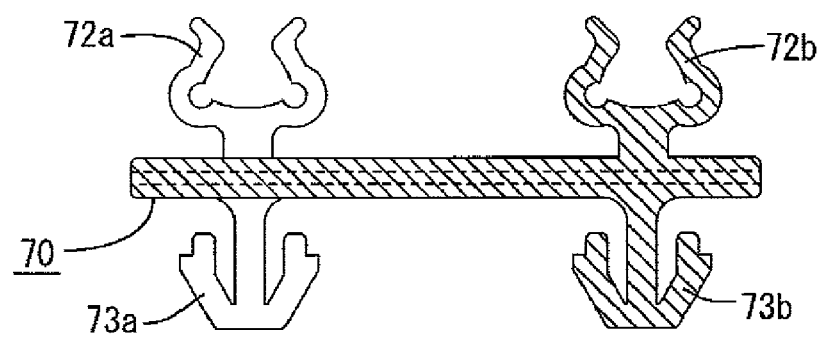
FIG. 13 is a first side view showing the construction of the lamp clip shown in FIG. 12.

Referring to FIGS. 12 and 13, the lamp clip 70 includes a first clip 71a and a second clip 71b. Lamp holders 72a, 72b are provided on the upper surfaces thereof, while engaging portions 73a, 73b are provided on the lower surfaces thereof so as to project to the chassis 14 side. In the present preferred embodiment, each engaging portion 73a, 73b is positioned right below the lamp holder 72a, 72b, so as to be arranged across the first clip 71a or the second clip 71b therefrom.

According to the construction, in the course of engagement of the lamp clip 70 with the chassis 14, the lamp holder 72a and the engaging portion 73a of the first clip 71a, and a mounting hole 14a can be linearly aligned. Similarly, the lamp holder 72b and the engaging portion 73b of the second clip 71b, and a mounting hole 14b can be linearly aligned.

This construction enables a simple design, because the arrangement interval for cold cathode tubes 17a and the interval for mounting holes 14a, 14b can be set to the same distance. Thus, the present lamp clip 70 can be suitably used to achieve a simple design.

Preferred Embodiment 4

Next, preferred embodiment 4 of the present invention will be explained with reference to FIGS. 14 and 15. The positions of engaging portions on a lamp clip are also modified in the present preferred embodiment 4. However, the other constructions are similar to the above preferred embodiment 1. Therefore, the same parts as the above preferred embodiment 1 are designated by the same symbols, and redundant explanations are omitted.

Figure 14:
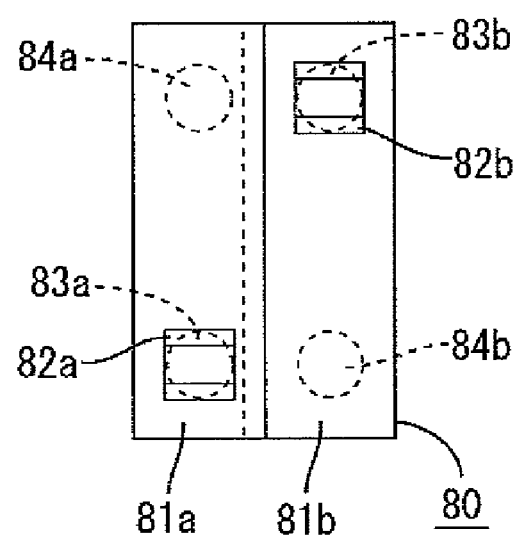
FIG. 14 is a plan view showing the construction of a lamp clip according to preferred embodiment 4 of the present invention.
Figure 15:
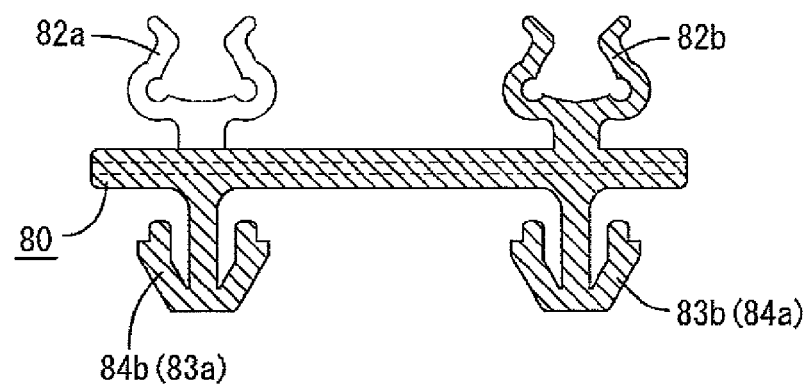
FIG. 15 is a first side view showing the construction of the lamp clip shown in FIG. 14.

Referring to FIGS. 14 and 15, the lamp clip 80 includes a first clip 81a and a second clip 81b. Lamp holders 82a, 82b are provided on the upper surfaces thereof, while engaging portions 83a, 84a, 83b, 84b are provided on the lower surfaces thereof so as to project to the chassis 14 side. In the present preferred embodiment, the engaging portions 83a, 84a are provided on the respective long-side-directional ends of the first clip 81a, while the engaging portions 83b, 84b are provided on the respective long-side-directional ends of the second clip 81b.

According to the construction, in regard to engagement of the lamp clip 80 with the chassis 14, the engagement can be achieved at two points on the first clip 81a, i.e., at the engaging portion 83a and the engaging portion 84a, and further can be achieved at two points on the second clip 81b, i.e., at the engaging portion 83b and the engaging portion 84b. Thus, the engagement of the lamp clip 80 with the chassis 14 can be achieved at four points and therefore by high engaging forces. Thereby, problems such as escape of the lamp clip 80 can be prevented.

Preferred Embodiment 5

Next, preferred embodiment 5 of the present invention will be explained with reference to FIGS. 16 and 17. The sliding mechanism of a lamp clip is modified in the present preferred embodiment 5. However, the other constructions are similar to the above preferred embodiment 1. Therefore, the same parts as the above preferred embodiment 1 are designated by the same symbols, and redundant explanations are omitted.

Figure 16:
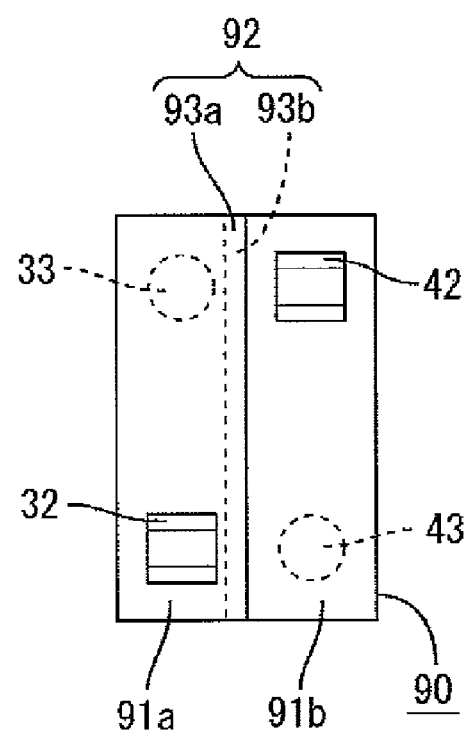
FIG. 16 is a plan view showing the construction of a lamp clip according to preferred embodiment 5 of the present invention.
Figure 17:
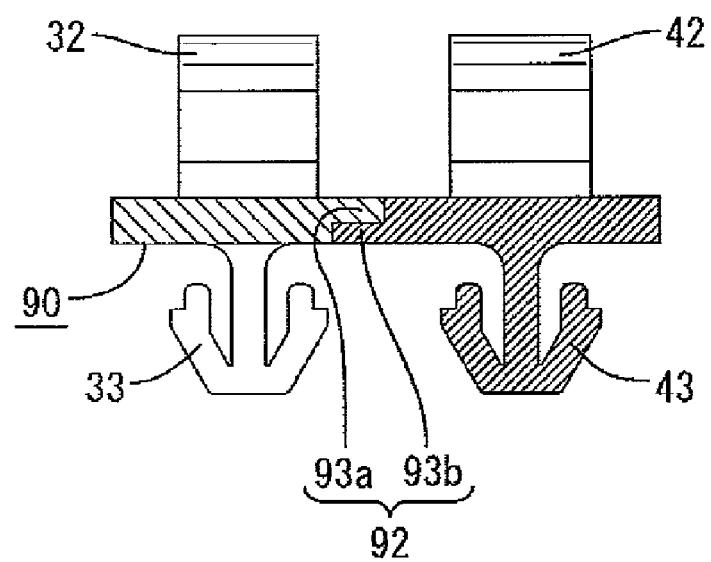
FIG. 17 is a second side view showing the construction of the lamp clip shown in FIG. 16.

Referring to FIGS. 16 and 17, the lamp clip 90 includes a first clip 91a and a second clip 91b, while the sliding mechanism 92 for parallel displacement thereof is provided therebetween. In the present preferred embodiment, the first clip 91a includes a guiding portion 93a arranged along the long side thereof, while the second clip 91b includes a guiding portion 93b arranged along the long side thereof. The guiding portion 93a is placed on the guiding portion 93b so as to overlap therewith, and thereby the sliding mechanism 92 is provided.

The sliding of the second clip 91b on the first clip 91a can be adequately achieved by the present simple sliding mechanism 92 including the overlapped guiding portions 93a, 93b, and thereby a predetermined distance can be provided between the lamp holders 32, 42.

Other Preferred Embodiments

Described above are preferred embodiments of the present invention. However, the present invention is not limited to the preferred embodiments explained in the above description made with reference to the drawings. The following preferred embodiments may be included in the technical scope of the present invention, for example.

In the above preferred embodiment 5, the lamp clip 20 including the sliding mechanism 92 preferably includes engaging portions 33 and 43, each of which is preferably located at the end portion that is on the opposite side of the lamp holder 32, 42. However, the lamp clip 60 having the sliding mechanism 92 may include engaging portions 63a and 63b, which are positioned in the longitudinal direction of the lamp clip 60 so as to be at central areas (as in FIG. 10), for example. Alternatively, the lamp clip 70 having the sliding mechanism 92 may include engaging portions 73a, 73b located right below the lamp holders 72a, 72b (as in FIG. 12). Further, the lamp clip 80 having the sliding mechanism 92 may include engaging portions 83a, 84a, 83b, 84b located at four respective points (as in FIG. 14).

In the above preferred embodiments, the first clip and the second clip preferably have rectangular plate-shaped configurations. However, the shapes thereof may be arbitrarily modified. Further, a preferred embodiment of the present invention can include a construction that uses a lamp clip including a first clip and a second clip, which differ in shape and/or size.

In the above preferred embodiments, each lamp clip preferably includes two lamp holders, for example. However, according to the present invention, the number of lamp holders included in a lamp clip can be set to any plural number, without limitation.

In the above preferred embodiments, polycarbonate is preferably used as a synthetic resin material for lamp clips. However, another synthetic resin material may be used instead. Further, the material for lamp clips is not limited to synthetic resin materials, but rather may be another kind of material such as a metallic material.

In the above preferred embodiments, the cold cathode tubes 17, 17 are preferably unequally spaced so as to provide an unequal lamp-pitch structure. However, all the cold cathode tubes may be equally spaced to provide an equal lamp-pitch structure.

In the above preferred embodiments, cold cathode tubes 17 are preferably used as linear light sources. However, the present invention can include a construction in which another type of linear light sources such as hot cathode tubes are used instead.

In the above preferred embodiments, a liquid crystal display device having a liquid crystal panel as a display panel is shown for illustrative purposes. However, the present invention can be applied to a display device that uses another type of display panel.

In the above preferred embodiments, a television receiver as a device having a tuner is shown for illustrative purposes. However, the present invention can be applied to a device that does not have a tuner.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. A lighting device for a display device, comprising:
a plurality of linear light sources each of which has an axis; and
a light source holding member arranged to hold said linear light sources; wherein said light source holding member includes a first member, a second member, and a sliding mechanism that is arranged between said first member and said second member and slidably connects said first member and said second member;

each of the first member and the second member has a rectangular or substantially rectangular shape including long sides and short sides, and each of the linear light sources is arranged such that the axis of each of the linear light sources crosses perpendicular or substantially perpendicular to the long side of each of the first member and the second member;

the sliding mechanism is arranged on the long side of each of the first member and the second member, and the first member and the second member are arranged adjacent to each other such that the long sides thereof slide along each other via the sliding mechanism;

said first member includes a first light source holder arranged to directly hold a first linear light source of said plurality of linear light sources such that the axis of the first linear light source crosses perpendicular or substantially perpendicular to the long side of the first member; and said second member includes a second light source holder arranged to directly hold a second linear light source other than said first linear light source such that the axis of the second linear light source crosses perpendicular or substantially perpendicular to the long side of the second member; and the first member and the second member are arranged to move along the sliding mechanism to change a distance between the first linear light source and the second linear light source.

2. The lighting device for a display device according to claim 1, wherein:

said sliding mechanism includes a rail portion provided on said first member, and a slide member provided on said second member; and said slide member is arranged to slide on said rail portion.

3. The lighting device for a display device according to claim 1, wherein:

said first light source holder is positioned at an end portion of the first member in a longitudinal direction thereof;

said second light source holder is positioned at an end portion of the second member in a longitudinal direction thereof; and said first light source holder and the second light source holder are spaced a predetermined distance from each other.

4. The lighting device for a display device according to claim 1, further comprising a chassis arranged to contain said plurality of linear light sources, wherein:

said chassis includes a bottom plate;

said light source holding member includes a first engaging portion and a second engaging portion, which project respectively from said first member and said second member toward said chassis; and said first engaging portion and said second engaging portion are inserted into mounting holes provided in the bottom plate of said chassis, so as to engage with said chassis as a result of the insertion.

5. The lighting device for a display device according to claim 1, wherein:

said plurality of linear light sources are arranged to be parallel or substantially parallel to each other;

said linear light sources are arranged at relatively narrow intervals in a narrow-interval area; and said linear light sources are arranged at relatively wide intervals in a wide-interval area.

6. The lighting device for a display device according to claim 5, further comprising a chassis arranged to contain said plurality of linear light sources, wherein said chassis includes a bottom plate;

said narrow-interval area is located at a central area of the bottom plate; and said wide-interval area is located at an end area of the array of the bottom plate.

7. A display device comprising:

the lighting device for a display device according to claim 1; and a display panel arranged to perform display by use of light from the lighting device for a display device.

8. The display device according to claim 7, wherein said display panel is a liquid crystal panel that uses liquid crystal.

9. A television receiver comprising the display device according to claim 7.

10. The lighting device for a display device according to claim 1, wherein:

the light source holding member includes a plurality of light source holding members, each of the plurality of light source holding members being arranged along the axis of one of the plurality of linear light sources;

a first set of the plurality of light source holding members holds at least two first linear light sources of the plurality of linear light sources that are arranged adjacent to each other, and configures a first holding member group;

a second set of the plurality of light source holding members holds at least two second linear light sources of the plurality of linear light sources that are arranged adjacent to each other, and configures a second holding member group;

the light source holding members included in the first set of the plurality of light source holding members are arranged to have a first distance therebetween;

the light source holding members included in the second set of the plurality of light source holding members are arranged to have a second distance therebetween; and the first distance is different from the second distance.

11. The lighting device for a display device according to claim 4, wherein:

said light source holding member includes at least two light source holding members;

the first member and the second member of each of the at least two light source holding members are arranged such that each of the first engaging portions and the second engaging portions of the first member and the second member is fitted to the mounting holes; and one of the at least two light source holding members has a first distance between the first member and the second member thereof, and another of the at least two light source holding members has a second distance between the first member and the second member thereof, wherein the first distance is different from the second distance.

* * * * *